US008055668B2

(12) United States Patent
Pomroy et al.

(10) Patent No.: US 8,055,668 B2
(45) Date of Patent: Nov. 8, 2011

(54) METHOD AND SYSTEM FOR MASKING DATA IN A CONSISTENT MANNER ACROSS MULTIPLE DATA SOURCES

(75) Inventors: Steven Patrick Pomroy, Mount Pearl (CA); David Isaac Morgan, St. Johns (CA); Michael Paul Spearns, St. Johns (CA); Robert Raymond Lake, Mount Pearl (CA)

(73) Assignee: Camouflage Software, Inc. (CA)

( * ) Notice: Subject to any disclaimer, the term of this patent is extended or adjusted under 35 U.S.C. 154(b) by 451 days.

(21) Appl. No.: 12/030,695

(22) Filed: Feb. 13, 2008

(65) Prior Publication Data

US 2009/0204631 A1    Aug. 13, 2009

(51) Int. Cl.
*G06F 7/00* (2006.01)
(52) U.S. Cl. ......... 707/757; 707/803; 707/756; 707/758
(58) Field of Classification Search .................. 707/655, 707/672–682, 756–758, 769, 781, 792, 802, 707/803, 55; 709/200; 713/162, 190, 191
See application file for complete search history.

(56) References Cited

U.S. PATENT DOCUMENTS

| | | | |
|---|---|---|---|
| 5,778,370 A * | 7/1998 | Emerson | 1/1 |
| 5,838,832 A | 11/1998 | Barnsley | |
| 5,995,971 A * | 11/1999 | Douceur et al. | 1/1 |
| 6,199,164 B1 | 3/2001 | Nishimoto et al. | |
| 6,215,748 B1 | 4/2001 | Greenwood et al. | |
| 6,253,203 B1 * | 6/2001 | O'Flaherty et al. | 1/1 |
| 6,397,224 B1 | 5/2002 | Zubeldia et al. | |
| 6,643,648 B1 * | 11/2003 | Ross et al. | 707/695 |
| 6,829,614 B2 | 12/2004 | Fujishima et al. | |
| 7,068,550 B2 | 6/2006 | La | |
| 7,099,469 B2 | 8/2006 | Kuhlman et al. | |
| 7,120,841 B2 | 10/2006 | Ohlhoff | |
| 7,124,157 B2 | 10/2006 | Ikake | |
| 7,127,432 B2 | 10/2006 | Rubin et al. | |
| 7,139,852 B2 | 11/2006 | LaBerge | |
| 7,158,979 B2 | 1/2007 | Iverson et al. | |
| 7,177,429 B2 | 2/2007 | Moskowitz et al. | |
| 7,185,017 B1 | 2/2007 | Cauvin et al. | |
| 7,200,757 B1 | 4/2007 | Muralidhar et al. | |
| 7,310,647 B2 | 12/2007 | Lei et al. | |
| 7,555,493 B2 * | 6/2009 | Khayter et al. | |

(Continued)

FOREIGN PATENT DOCUMENTS

CA         2100234         4/1994

(Continued)

*Primary Examiner* — Srirama Channavajjala
*Assistant Examiner* — Reza Hosseini
(74) *Attorney, Agent, or Firm* — Conley Rose, P.C.

(57) ABSTRACT

A method and system for data masking a series of interrelated data records is disclosed. A lockable translation matrix repository resource is provided to contain both masked data as well as appropriate key information that provides links between respective copies of respective interlinked databases and maintains the data integrity of masking data inserted therein. Records are masked on a column by column or table by table basis. Records for which masking data is already in the repository are masked by making use of such data, while remaining records are segregated, masked and the masking data updated to the repository. Preferably a backup copy of the masked data records is stored in the repository to permit de-masking of the data records at a later stage. Pivot tables are applied where keys do not match exactly but still exhibit a one-to-one relationship.

18 Claims, 16 Drawing Sheets

U.S. PATENT DOCUMENTS

| | | |
|---|---|---|
| 2002/0116417 A1* | 8/2002 | Weinberg et al. ............. 707/517 |
| 2004/0181670 A1 | 9/2004 | Thune et al. |
| 2004/0199781 A1 | 10/2004 | Erickson et al. |
| 2005/0198043 A1 | 9/2005 | Gruber et al. |
| 2005/0251865 A1 | 11/2005 | Mont et al. |
| 2006/0059148 A1 | 3/2006 | Dunki et al. |
| 2006/0059149 A1 | 3/2006 | Dunki et al. |
| 2006/0059189 A1 | 3/2006 | Dunki et al. |
| 2006/0074897 A1 | 4/2006 | Fergusson |
| 2006/0085761 A1 | 4/2006 | Allen et al. |
| 2006/0120527 A1 | 6/2006 | Baek |
| 2006/0129589 A1 | 6/2006 | Thornton et al. |
| 2006/0129848 A1 | 6/2006 | Paksoy et al. |
| 2006/0153382 A1 | 7/2006 | Mai |
| 2006/0179075 A1 | 8/2006 | Fay |
| 2006/0224631 A1 | 10/2006 | Kwon |
| 2006/0224777 A1 | 10/2006 | Sand et al. |
| 2007/0299881 A1 | 12/2007 | Bouganim |
| 2008/0065665 A1 | 3/2008 | Pomroy et al. |
| 2008/0082834 A1* | 4/2008 | Mattsson ..................... 713/189 |

FOREIGN PATENT DOCUMENTS

| | | |
|---|---|---|
| CA | 2216605 | 10/1996 |
| CA | 2293650 | 1/1999 |
| CA | 2555428 | 10/2005 |
| CA | 2532399 | 8/2006 |
| CA | 2564058 | 5/2007 |

* cited by examiner

Create Unmasked Sub-Table (a)

(b)

Merge Masked and Unmasked Subtable

Newly Masked Sub-Table 1 — 510

| Masked KEY | DATA (Masked) | | Unmasked KEY |
|---|---|---|---|
| A | 88888 | | 1 |
| B | 55555 | | 2 |
|  |  |  |  |

511  512  513

Partially Masked Sub-Table 1

| Masked KEY | DATA (Masked) | | Unmasked KEY |
|---|---|---|---|
| <Empty> | <Empty> | <Empty> | <Empty> |

Table 1 (Masked) — 610

| KEY | DATA | |
|---|---|---|
| A | 88888 | |
| B | 55555 | |
|  |  |  |

(a)

Newly Masked Sub-Table 2 — 520

| Masked KEY | DATA (Masked) | | Unmasked KEY |
|---|---|---|---|
| C | 66666 | | 3 |
|  |  |  |  |

521  522  523

320

Partially Masked Sub-Table 2

| Masked KEY | DATA (Masked) | | Unmasked KEY |
|---|---|---|---|
| A | 88888 | | 1 |
|  |  |  |  |

321  322  323   Merge

Table 2 (Masked) — 620

| KEY | DATA | |
|---|---|---|
| A | 88888 | |
| C | 66666 | |
|  |  |  |

METHOD AND SYSTEM FOR MASKING DATA IN A CONSISTENT MANNER ACROSS MULTIPLE DATA SOURCES

RELATED APPLICATIONS

Not Applicable.

FIELD

The present application relates to data privacy, and more particularly to a method and system for masking data across a plurality of interrelated databases.

BACKGROUND

In today's technology-driven economy, the need for data privacy and information security has never been greater. As organizations increasingly collect, store and distribute sensitive data, so grows the requirement to protect such information from unauthorized uses. In 2006, it was estimated that 54 percent of information in databases is considered confidential, including employee, customer, financial and supplier information. Approximately one-third of senior-level corporate and technology leaders do not trust their companies ability to protect sensitive data. Information governance has become a universal business mandate, thus placing considerable pressure on organizations worldwide to ensure the protection of sensitive data.

The focus of many organizations has been to secure production data stored and used in IT systems across networks; however organizations are now beginning to realize the importance of protecting data while stored and used outside production environments. Once sensitive data is exposed to individuals in non-production environments, the potential for internal data theft greatly increases. While organizations have been focused primarily on protecting sensitive data from external theft, researchers currently indicate that 70 to 80 percent of all security incidents come from insiders. It has been reported that 35 percent of IT professionals have abused their computer security and information access privileges in an attempt to access proprietary data.

Researchers currently estimate that 45 percent of organizations use live production data in non-production environments for such activities as software development, application testing, quality assurance, training, data mining/research, offshoring and outsourcing. The use of sensitive data for such non-production activities is often strictly prohibited by privacy legislation as well as by organizations' internal privacy policies.

Data masking is a process whereby the information in a database is masked or de-identified to ensure the protection of sensitive information used in non-production environments, while enabling the creation of realistic data without risk of unnecessarily exposing sensitive information. The data masking process enforces 'need to know access', minimizing the risks associated with using real production data in non-production environments. It is useful in situations where data is shared with third parties, either on-site, offsite, or offshore. Data masking has emerged as a new product class, and is now used throughout industry in addressing worldwide data privacy problems.

Large organizations typically have a number of database systems that integrate with each other. For instance, a Human Resources system and a Financials system might share certain data to support their respective business functions.

Accordingly, it is desirable to provide a novel and improved method and system for data masking that maintains data integrity across a plurality of inter-related databases.

It is further desirable to provide a novel and improved method and system for data masking that permits reversal of data masking for use in conjunction with unmasked databases.

SUMMARY

The present application accomplishes the foregoing by providing a lockable translation matrix repository in conjunction with a data masking system that removes personally identifiable information from a database for use in numerous applications including but not limited to software testing, development, training, and research. The repository contains both original and masked data as well as appropriate key information that provides links between copies of respective interlinked databases and maintains the data integrity of masking data inserted therein.

Advantageously, the present application maintains consistent data relationships across time, allowing data to be masked consistently from refresh to refresh.

Preferably, the present application may be used to revert masked data back to its original form for use in integrating with non-masked data sources.

According to a first broad aspect of an embodiment of the present application there is disclosed a method for data masking at least one data field of at least one data record in a primary database and at least one data field of at least one data record in a secondary database that has a key field having a correspondence with a key field in the at least one data record in the primary database, using a table of translation matrix records comprising an unmasked key field and at least one masked data field corresponding to the at least one data field of the at least one data record, the method comprising the actions of: with respect of the primary database: (a) comparing the key field of the at least one data record in the corresponding database against the unmasked key field of each of the translation matrix records; (b) populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record; (c) populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record; (d) masking the at least one data field of the second sub-table record; (e) adding the first sub-table record or the masked second sub-table record as a masked record in a masked copy of the corresponding database; (f) if the masked second sub-table record was created, populating a translation matrix record corresponding thereto using the key field and the at least one data field for the unmasked key field and the at least one masked data field; and (g) repeating all actions performed with respect of the primary database with respect of the secondary database; whereby at least one data field of the at least one data record of the primary database and the at least one data field of the at least one data record of the secondary database are masked in a consistent manner.

According to a second broad aspect of an embodiment of the present application there is disclosed a system for data masking at least one data field of at least one data record in a primary database and at least one data field of at least one data record in a secondary database that has a key field having a correspondence with a key field in the at least one data record in the primary database, the system comprising: a memory for storing data records, including a table of translation matrix records comprising an unmasked key field and at least one masked data field corresponding to the at least one data field of the at least one data record; a processor coupled to the memory for: in respect of the primary database, executing instructions for: (a) comparing the key field of the at least one data record in the corresponding database against the unmasked key field of each of the translation matrix records; (b) populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record; (c) populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record; (d) masking the at least one data field of the second sub-table record; (e) adding the first sub-table record or the masked second sub-table record as a masked record in a masked copy of the corresponding database; (f) if the masked second sub-table record was created, populating a translation matrix record corresponding thereto using the key field and the at least one data field for the unmasked key field and the at least one masked data field; and (g) repeating the instructions in respect of the primary database with respect of the secondary database; whereby at least one data field of the at least one data record of the primary database and the at least one data field of the at least one data record of the secondary database are masked in a consistent manner.

According to a third broad aspect of an embodiment of the present application there is disclosed a processor in a system for data masking at least one data field of at least one data record in a primary database and at least one data field of at least one data record in a secondary database that has a key field having a correspondence with a key field in the at least one data record in the primary database, the processor being operatively coupled to a memory for storing data records including a table of translation matrix records comprising an unmasked key field and at least one masked data field corresponding to at least one data field of the at least one data record for: in respect of the primary database, executing instructions for: (a) comparing the key field of the at least one data record in the corresponding database against the unmasked key field of each of the translation matrix records; (b) populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record; (c) populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record; (d) masking the at least one data field of the second sub-table record; (e) adding the first sub-table record or the masked second sub-table record as a masked record in a masked copy of the corresponding database; (f) if the masked second sub-table record was created, populating a translation matrix record corresponding thereto using the key field and the at least one data field for the unmasked key field and the at least one masked data field; and (g) repeating the instructions in respect of the primary database with respect of the secondary database; whereby at least one data field of the at least one data record of the primary database and the at least one data field of the at least one data record of the secondary database are masked in a consistent manner.

According to a fourth broad aspect of an embodiment of the present application there is disclosed a computer-readable medium coupled to a processor, in a system for data masking at least one data field of at least one data record in a primary database and at least one data field of at least one data record in a secondary database that has a key field having a correspondence with a key field in the at least one data record in the primary database, the medium for storing data records including a table of translation matrix records comprising an unmasked key field and at least one masked data field corresponding to at least one data field of the at least one data record, and having stored thereon, computer-readable and computer-executable instructions which, when executed by the processor, cause the processor to perform steps comprising: (a) comparing the key field of the at least one data record in the corresponding database against the unmasked key field of each of the translation matrix records; (b) populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record; (c) populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record; (d) masking the at least one data field of the second sub-table record; (e) adding the first sub-table record or the masked second sub-table record as a masked record in a masked copy of the corresponding database; (f) if the masked second sub-table record was created, populating a translation matrix record corresponding thereto using the key field and the at least one data field for the unmasked key field and the at least one masked data field; and (g) repeat the instructions in respect of the primary database with respect to the secondary database; whereby at least one data field of the at least one data record of the primary database and the at least one data field of the at least one data record of the secondary database are masked in a consistent manner.

BRIEF DESCRIPTION OF THE DRAWINGS

The embodiments of the present application will now be described by reference to the following figures, in which identical reference numerals in different figures indicate identical elements and in which.

DETAILED DESCRIPTION

The present application will now be described for the purposes of illustration only, in conjunction with certain embodiments shown in the enclosed drawings.

Figure 1:
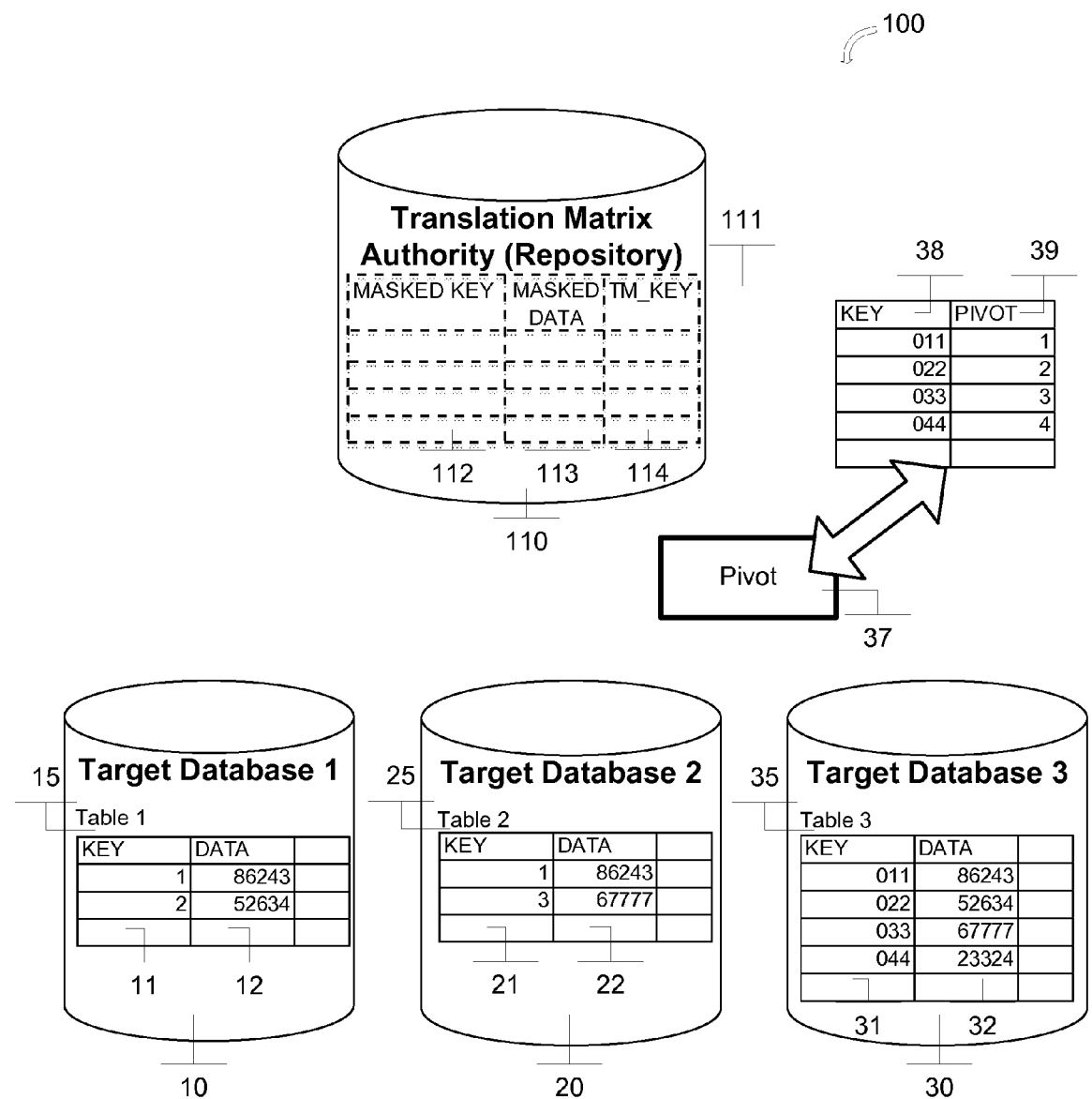
FIG. 1 is a simplified block diagram showing a plurality of target databases to be masked and a translation repository according to an example embodiment of the present application.

Referring first to FIG. 1, there is shown, a simplified block diagram according to an example embodiment of the present application at an initial or starting stage. The system, shown generally at 100, interacts with a plurality of integrated or interrelated databases, of which, three are shown for example purposes only as databases 10, 20 and 30 respectively comprising Table 1 15, Table 2 25 and Table 3 35 respectively. Tables 1 15 and 2 25 are shown, by way of example only, as having two columns or fields in common, namely respective key columns 11, 21 and data columns 12, 22.

By way of example only, in this application, key columns are so designated because they may act as a key to permit the interrelationship of a plurality of columns from different tables, whether directly or otherwise. Data columns are so designated because they do not act as such a key. As will be discussed herein, data masking operations may take place on columns in either or both of key columns and data columns.

Those having ordinary skill in this art will appreciate that each of target databases 10, 20 may also have additional columns which may or not be common to each database and/or other databases and which may be either key columns or data columns.

As shown by way of example in the FIG. 1, not all data records in rows of Table 1 15 will appear in rows of Table 2 25 or vice versa. Rather, a number of rows may be common to each table, while others may not be. Still others may be in common with another table in one of these databases or another database (not shown).

As shown by way of example in FIG. 1, Table 3 35 also has a key column 31 and a data column 32. While, as shown, the Table 3 data column 32 has similar data to the data columns 12, 22 of the other tables, and which, in general, need not necessarily be the case. The Table 3 key column 31 is different from the other key columns 11, 21, although it remains in a one-to-one relationship with them. This may occur, for example, when database applications from different parts of the organization are developed for a limited purpose according to one set of data standards and are then integrated into the larger organization that follows a different set of data standards. This is often the case when applications from acquired business units are integrated into the acquiring company's suite of database applications.

Nevertheless, the one-to-one relationship between Table 3 key column 31 and the other key columns 11, 21, may be preserved in a pivot table 37 associated with Table 3 35. The pivot table 37 allows for synchronization across tables and/or databases when there are no key columns that match identically by which data columns in different database tables may be directly linked, by maintaining respective pairs of columns exhibiting the desired one-to-one relationship, such as pivot key 1 column 38 and pivot key 2 column 39.

The data in the key columns 11, 21, 31 and in the data column 12, 22, 32 are shown in unmasked form.

The primary constituent of the system 100 is a data repository known as the Translation Matrix Authority (TMA) 110. Repository 100 serves as a common point of reference in keeping various target databases 10, 20, 30 synchronized. Data stored in the repository 110, such as one or more translation matrix tables 111, which is shown in dashed outline to signify that at the present initial stage it does not exist or is empty, may be referenced when data masking the target databases 10, 20, 30 in order to maintain data consistency, even among masked data values. As shown in example fashion, the translation matrix table 111 may comprise a masked key column 112, a masked data column 113 and a TM_key column 114.

Figure 2:
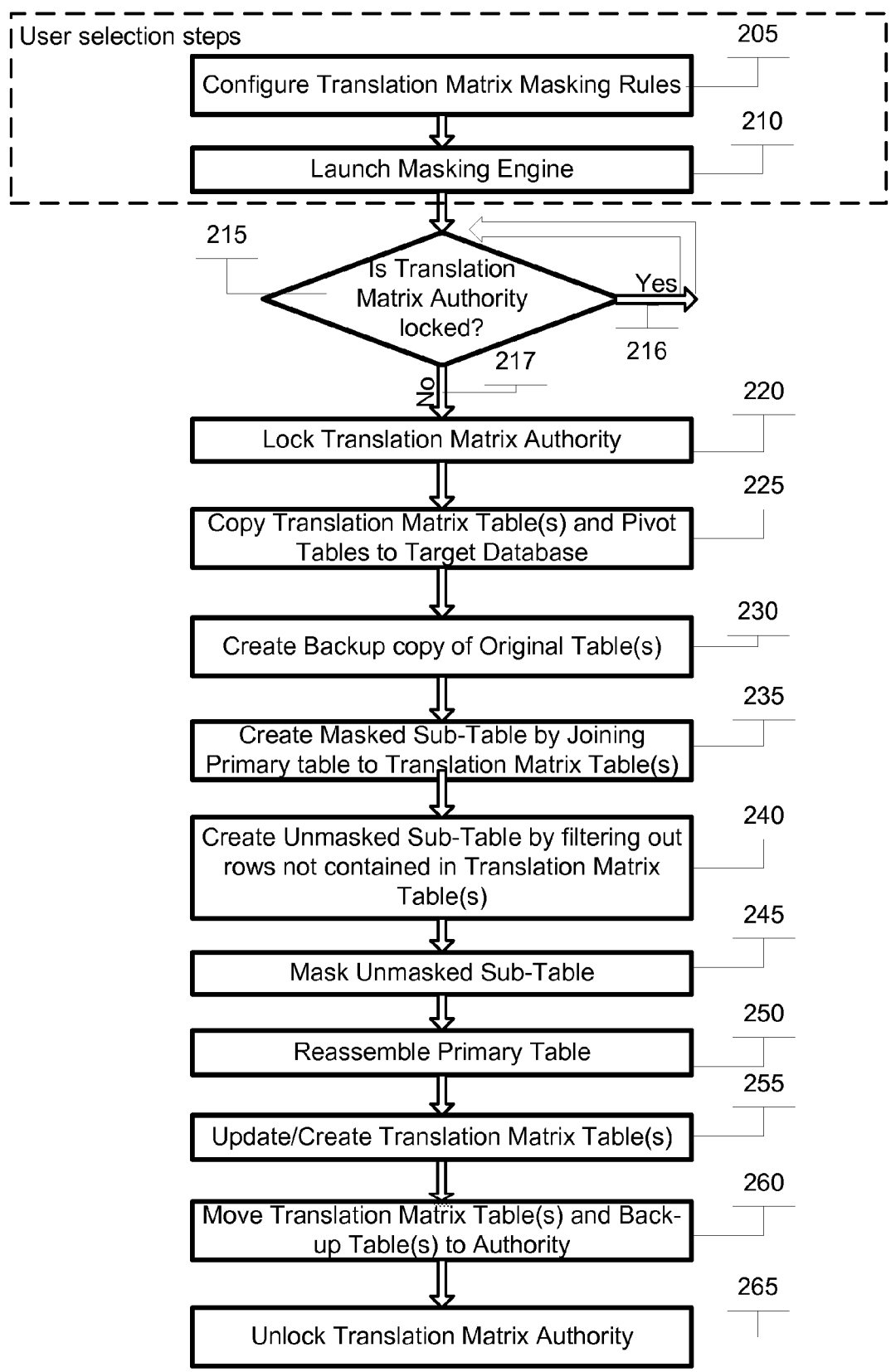
FIG. 2 is a flow chart showing processing steps that may be followed in performing a data masking operation on a table according to an example embodiment of the present application.

Turning now to FIG. 2, there is shown a simplified flow chart of processing steps to accomplish data masking across a plurality of interrelated databases, without introducing inconsistencies in the masked data.

Initially, the system 100 accepts a user-selected suite of masking rules 205. This includes specification of the data structures to be masked, the particular columns to be masked, the algorithm or transformation to be used in masking each identified column, and key data by which each of the interrelated data structures may be linked.

For example, in the example of FIG. 1, it may be that the rules identify Tables 1 15, Table 2 25 and Table 3 35 in databases 10, 20, 30 respectively as to be masked. In Table 1 15, both key column 11 and data column 12 are to be masked, using a shuffle and a replace transformer respectively, such as is discussed in co-pending U.S. patent application Ser. No. 11/517,251 entitled "Data Masking System and Method" filed by Pomroy et al. which is incorporated by reference in its entirety herein. Pomroy et al. disclose a system and method for data masking target data columns of a data record that uses an original database with data records having at least one target data column and a copied database, including a copy of at least a portion of the original database. Data masking consists of adding a row-identifier column with an index to a primary data record to form primary row-identifier data records, creating empty delta data records, performing data transformations on the target data columns to form masked delta data records, merging the masked delta data records with the primary row-identifier data record to form a masked delta data record, copying a related data record and joining with said primary row-identifier data record to form a related row-identifier data record and then merging the related row-identifier data record with the masked primary data record to form a masked related data record.

Upon completion of configuration of the user-selected suite of masking rules 205, the masking engine is launched 210. The general operation of the masking engine is introduced in co-pending U.S. patent application Ser. No. 11/517,251 and incorporated by reference in its entirety herein. Alternatively any other suitable data masking system, for example, such as disclosed in U.S. Pat. No. 7,200,757 entitled "Data Shuffling Procedure for Masking Data" and issued Apr. 3, 2007 to Muralidhar et al., which discloses a method for data shuffling to preserve data confidentiality, comprising masking of particular attributes of a dataset which are to be preserved in confidentiality, followed by a shuffling step comprising sorting the transformed dataset and a transformed confidential attribute in accordance with the same rank order criteria.

Similarly, in Table 2 25, both key column 21 and data column 22 are to be masked using corresponding transformers and in Table 3 35, both key column 31 and data column 32 are to be masked using appropriate transformers. Data columns 12, 22 are specified to be linked by key columns 11, 21, while data column 32 is specified to be linked to the other data columns by pivot table 37 comprising pivot key column 1 38 and pivot key column 2 39.

At step 215, an inquiry is made as to the lock status of the repository 110. Because the databases 10, 20, 30 and the system 100 may be used in a distributed fashion, it is possible to have a multiplicity of users attempting to perform data masking simultaneously. As is well known to those skilled in the art of database management system design, in such multitasking environments, it is prudent to apply a locking system to data structures that may be updated across a plurality of processing steps, such as the repository 110.

Thus, if the repository 110 is locked 216, this signifies that an update of a data structure therein is in progress and processing stalls until the repository 110 is unlocked 217. Alternatively processing may be halted and an error message displayed.

At this point, the repository 110 is locked 220, so as to preclude interference by another process in the masking operation being performed by the masking engine.

In the present application, all processing performed by the masking engine is performed on a set of target databases, which are initially mirror copies of the actual databases. The set of target databases also maintains a temporary (working) copy of the repository 110, as well as all identified pivot tables 35. Thus, once the repository 110 has been locked 220, the current version of the repository 110 and the pivot tables 35 are copied back into the set of target databases 225.

As well, the columns of the table being masked (the "primary table") which are referenced in the masking configuration step 205 as to be masked are copied as a backup copy to the set of target databases 230.

It is preferred that the system 100 work with copies of the databases for several reasons. First, the actual databases will presumably continue to be used for "real" operations in unmasked form. Second, copies are used to safeguard against any potential for data corruption.

After the backup table has been created 230, to the extent that data exists in the repository 110, a partially masked sub-table may be created 235. This is accomplished by applying the previously masked values stored in a translation matrix table in the repository 110 to corresponding data records in the backup table. In some cases, certain columns in one of the pivot tables 37 is used to create associations between one of the translation matrix tables 111 and the backup table.

Figure 3:
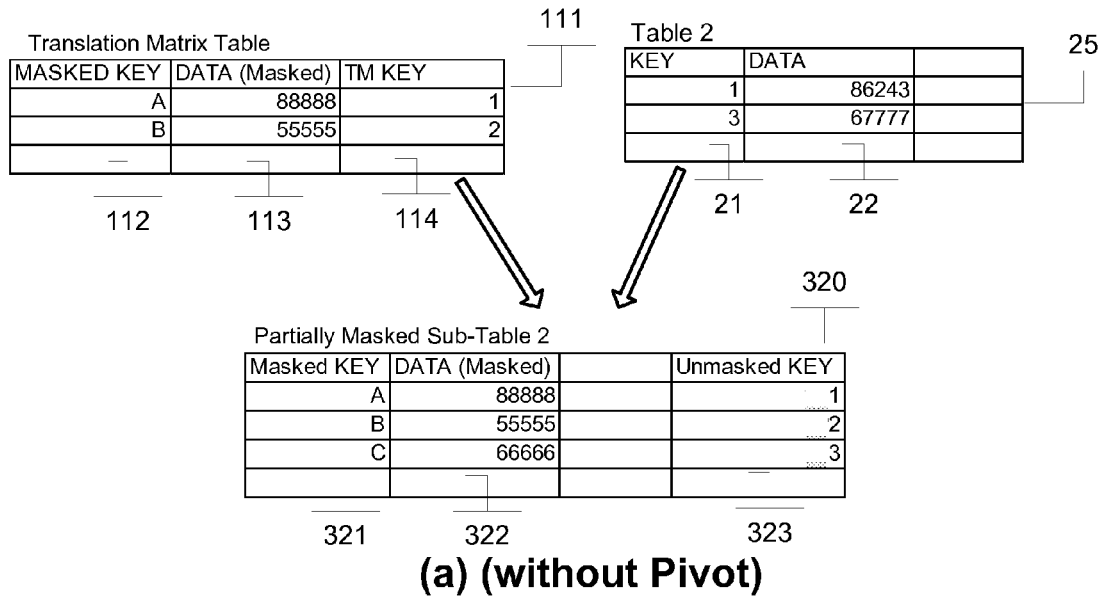
FIG. 3 is a series of simplified processing flow diagrams showing creation of a partially masked sub-table in the process of FIG. 2.
Figure 3:
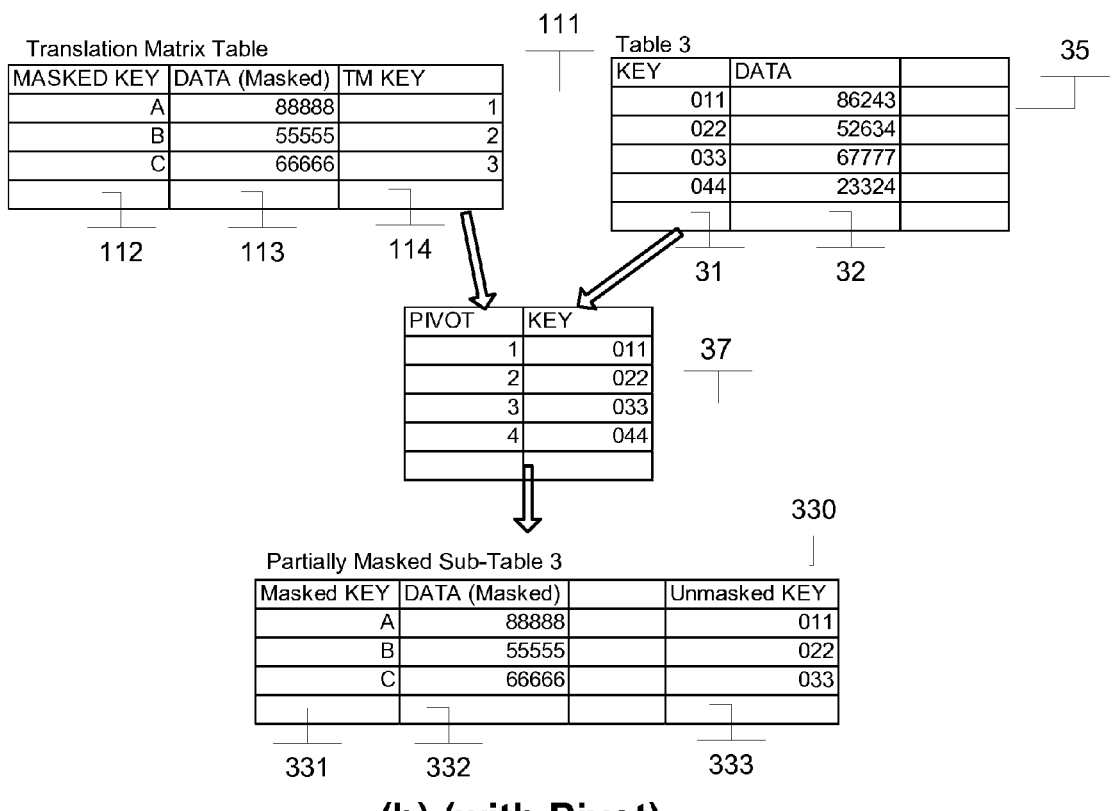

The processing involved in this step 235 may be shown in illustrative fashion in FIGS. 3(a) and (b). The scenario envisaged in FIG. 3(a) is for creating a partially masked sub-table 320 without involving a pivot table 37, using the masking of the columns of Table 2 25 as an example, while the scenario envisaged in FIG. 3(b) is for creating a partially masked sub-table 330 using pivot table 37, and using the masking of the columns of Table 3 35 as an example.

The processing involves copying the key column 21, 31 in to the partially masked sub-table 320, 330 as an unmasked key column 323, 333, masking each value in the key column 21, 31 and copying such masked value into a masked key column 321, 331 in the partially masked sub-table 320, 330 and masking each value in the data column(s) 22, 32 to be masked, and copying such masked value(s) into a corresponding data (masked) column 322, 332 in the partially masked sub-table 320, 330.

Those having ordinary skill in this art will appreciate that at an initial stage, such as for the masking of the columns of Table 1 15, the repository 110 (or if created, the translation matrix table 111) is empty, so that this step 235 is effectively skipped.

Upon creation of the masked sub-table 235, an unmasked sub-table is created 240. This is accomplished by identifying records in the backup table that have not been masked during creation of the masked sub-table 320, 330. These records are copied into the unmasked sub-table.

Figure 4:
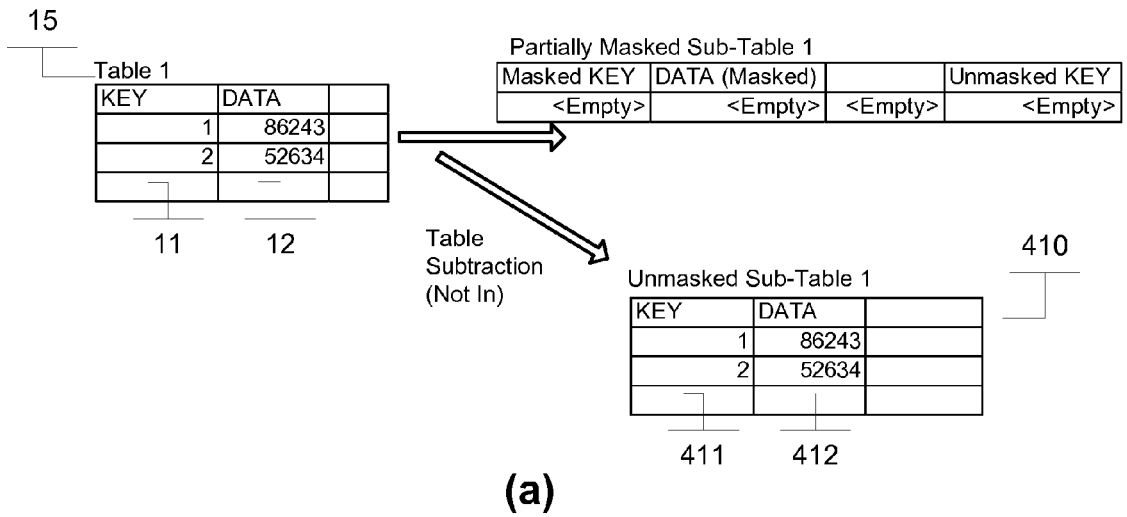
FIG. 4 is a series of simplified processing flow diagrams showing creation of an unmasked sub-table in the process of FIG. 2.
Figure 4:
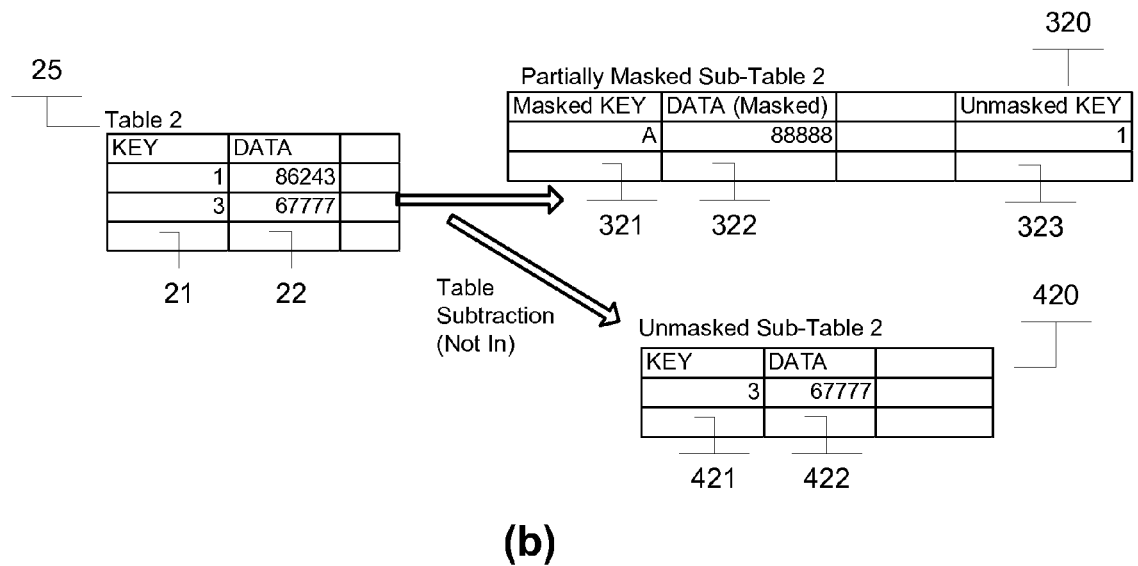
Figure 4:
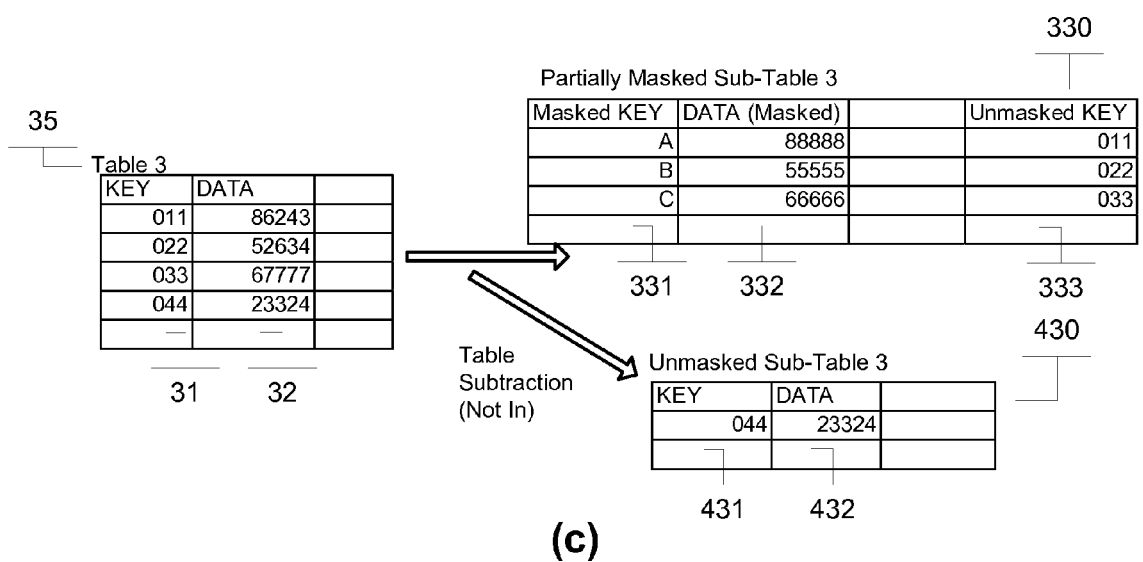

The processing involved in this step 240 may be shown in illustrative fashion in FIG. 4(a) through (c), corresponding to the processing at this step for each of Table 1 15, Table 2 25 and Table 3 35 respectively.

The processing involves identifying those rows in the primary table 15, 25, 35 that have a corresponding record in the translation matrix table 111. Such rows may be identified by comparing records in the unmasked key column 323, 333 of the partially masked sub-table 320, 330 with records in the key column 11, 21, 31 in the primary table 15, 25, 35.

If no match is found, a record in the unmasked sub-table 410, 420, 430 is created from the corresponding records in the primary table 15, 25, 35, for example, in key column 411, 421, 431 and data column 412, 422, 432.

Those having ordinary skill in this art will appreciate that at the initial stage, such as for the masking of the columns of Table 1 15, when the repository 110 (or if created, the translation matrix table 111) is empty, nothing has been performed at step 230, so that no partially masked sub-table exists and all of the row records in Table 1 15 will be copied into the unmasked sub-table 410 during this step.

In respect of Table 2 25 and Table 3 35, a masked sub-table 320, 320 was created at step 235, but not all of the records in Table 2 25 and Table 3 35 were masked during that step. Accordingly, an unmasked sub-table 420, 430, respectively, is created to contain those records in Table 2 25 and Table 3 35 that were not masked and copied into masked sub-tables 320, 330.

Those having ordinary skill in this art will appreciate that, in a scenario (not shown) wherein the translation matrix table proved sufficient to mask all of the records in the table to be masked at step 235, the unmasked sub-table is empty, so that this step 240 is effectively skipped.

Once the unmasked sub-table 410, 420, 430 has been created 240, it may be masked 245 in conventional fashion by the masking engine in conformity with the user-selected masking rules. In some cases, certain columns in the pivot tables 37 may be used to create associations between one of the translation matrix tables and the unmasked sub-table.

Figure 5:
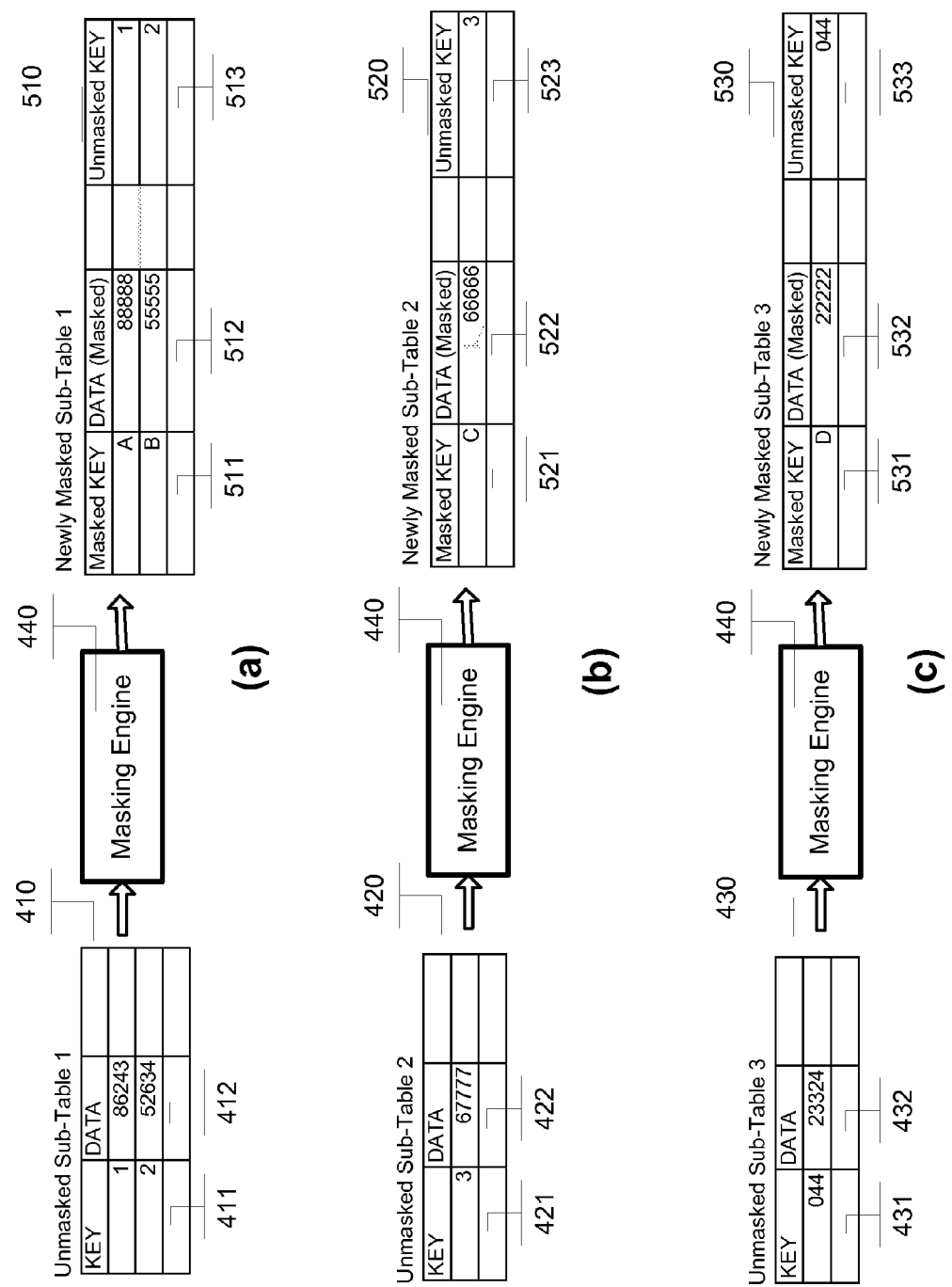
FIG. 5 is a series of simplified processing flow diagrams showing masking of the unmasked sub-table of FIG. 4 to create a newly-masked sub-table.

The processing involved in this step 245 may be shown in illustrative fashion in FIG. 5(a) through (c), corresponding to the processing at this step for each of Table 1 15, Table 2 25 and Table 3 35 respectively and resulting in a newly masked sub-table 510, 520, 530 respectively.

The processing involves copying each of the records in key column 411, 421, 431 into corresponding records in the unmasked key column 513, 523, 533 and masking, using the user-selected transform, each of the records in key column 411, 421, 431 and in data column 412, 422, 432 and writing the masked values corresponding thereto into the masked key column 511, 521, 531 and the data (masked) column 512, 522, 532.

Thereafter, the newly masked unmasked sub-table (if any) may be merged 250 with the masked sub-table (if any) to create a masked version of the primary table.

Figure 6:
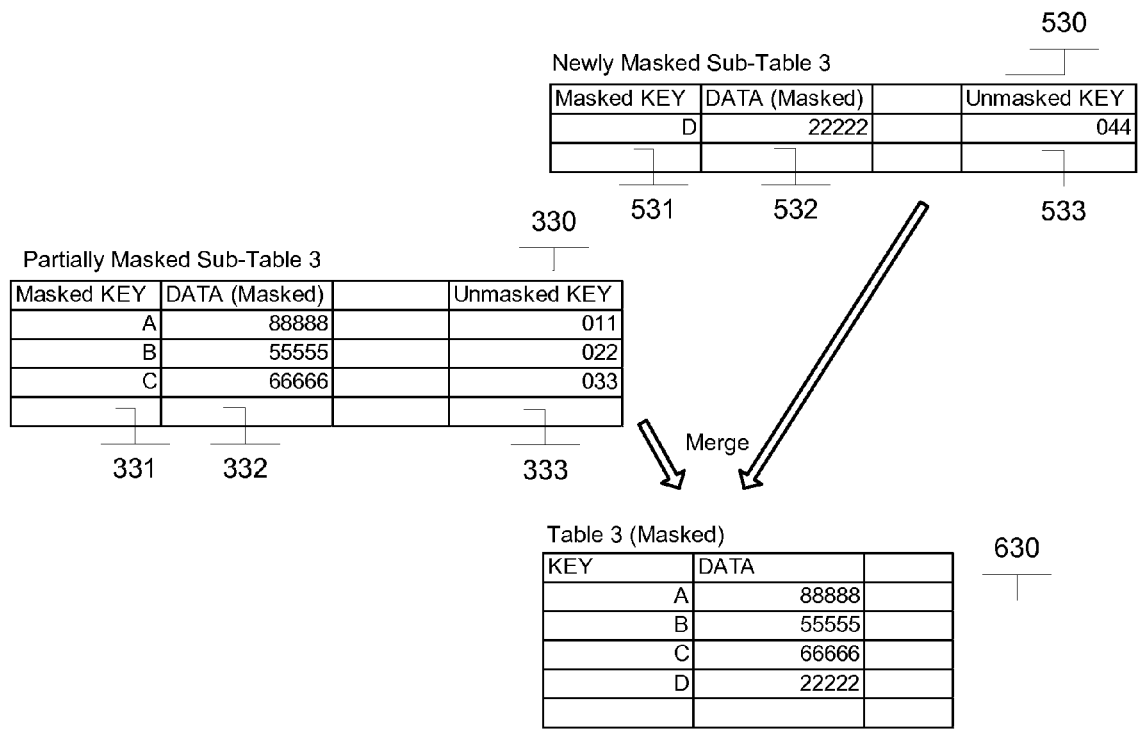
FIG. 6 is a series of simplified processing flow diagrams showing merging of the partially masked sub-table of FIG. 3 with the newly-masked sub-table of FIG. 5.

The processing involved in this step 250 may be shown in illustrative fashion in FIGS. 6(a) through (c), corresponding to the processing at this step for each of Table 1 15, Table 2 25 and Table 3 35 respectively and resulting in a masked version of the primary table 610, 620, 630 respectively.

The processing involves merging or adding the rows in the newly masked sub-table 510, 520, 530 with the rows in the corresponding partially masked sub-table 320, 330 and sorting, if appropriate, to provide a masked version of the primary table 610, 620, 630, containing each of the rows of the original primary table 15, 25, 35.

The translation matrix table 111 copied 255 from the repository 110 may then be merged with the newly masked unmasked sub-table 255 to create an updated translation matrix table 111.

Figure 7A:
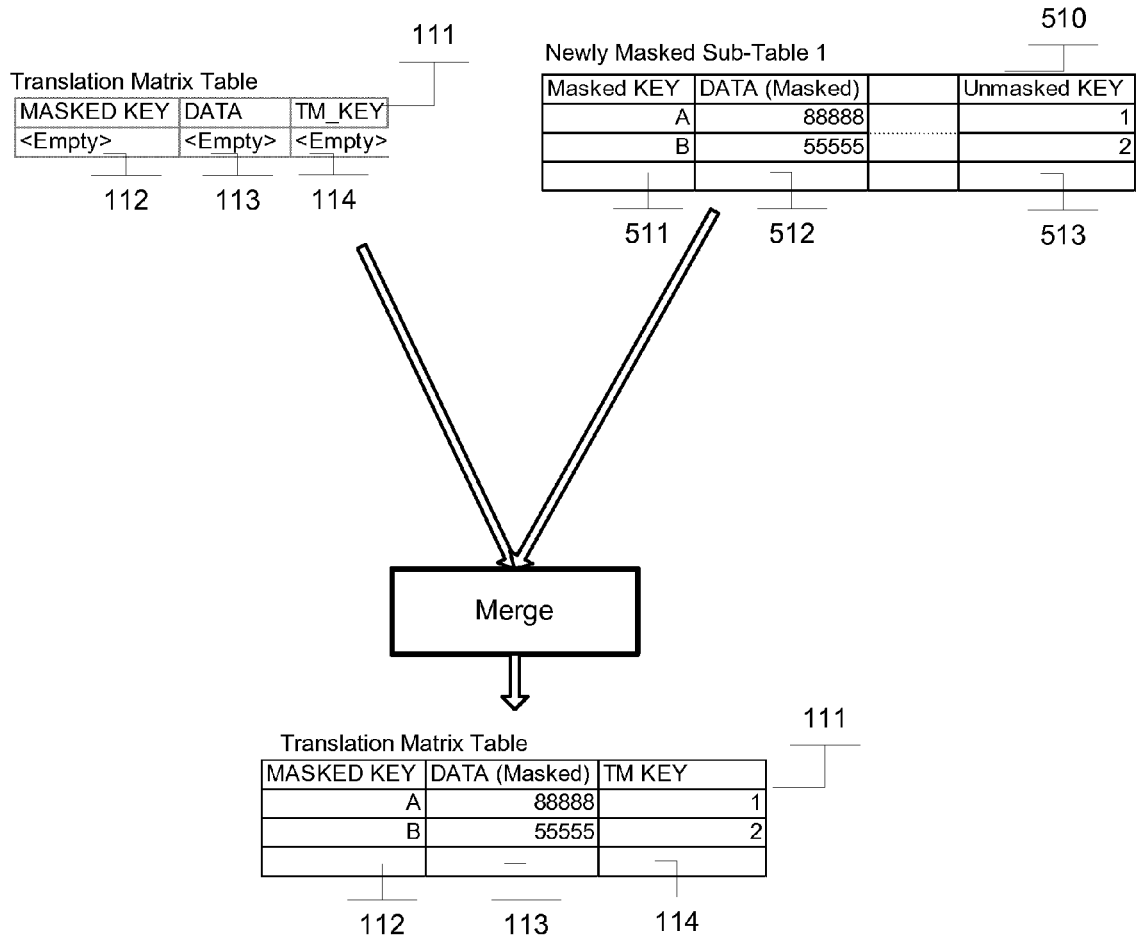
FIG. 7 is a series of simplified processing flow diagrams showing creation or updating of a translation matrix table in the process of FIG. 2.
Figure 7B:
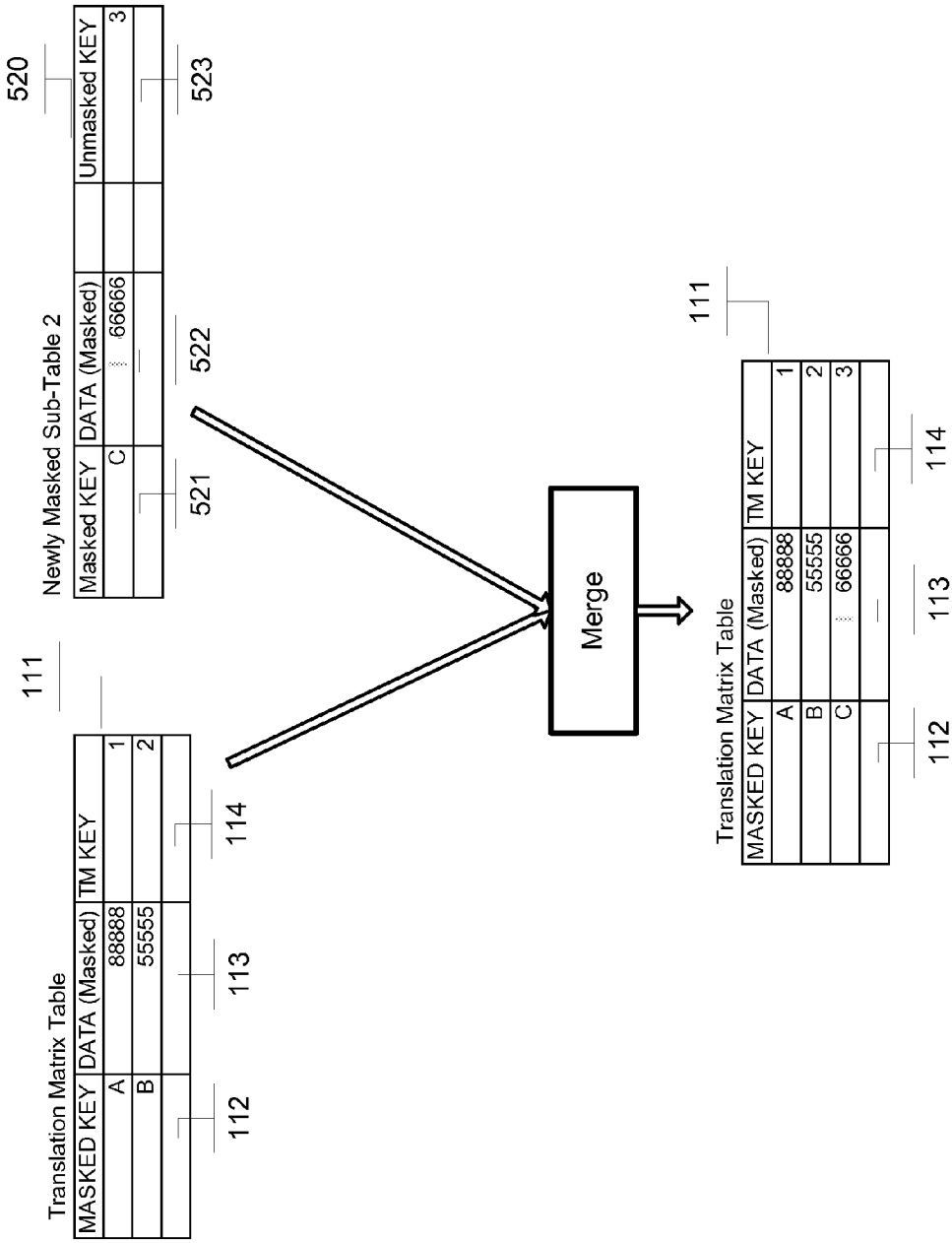
Figure 7C:
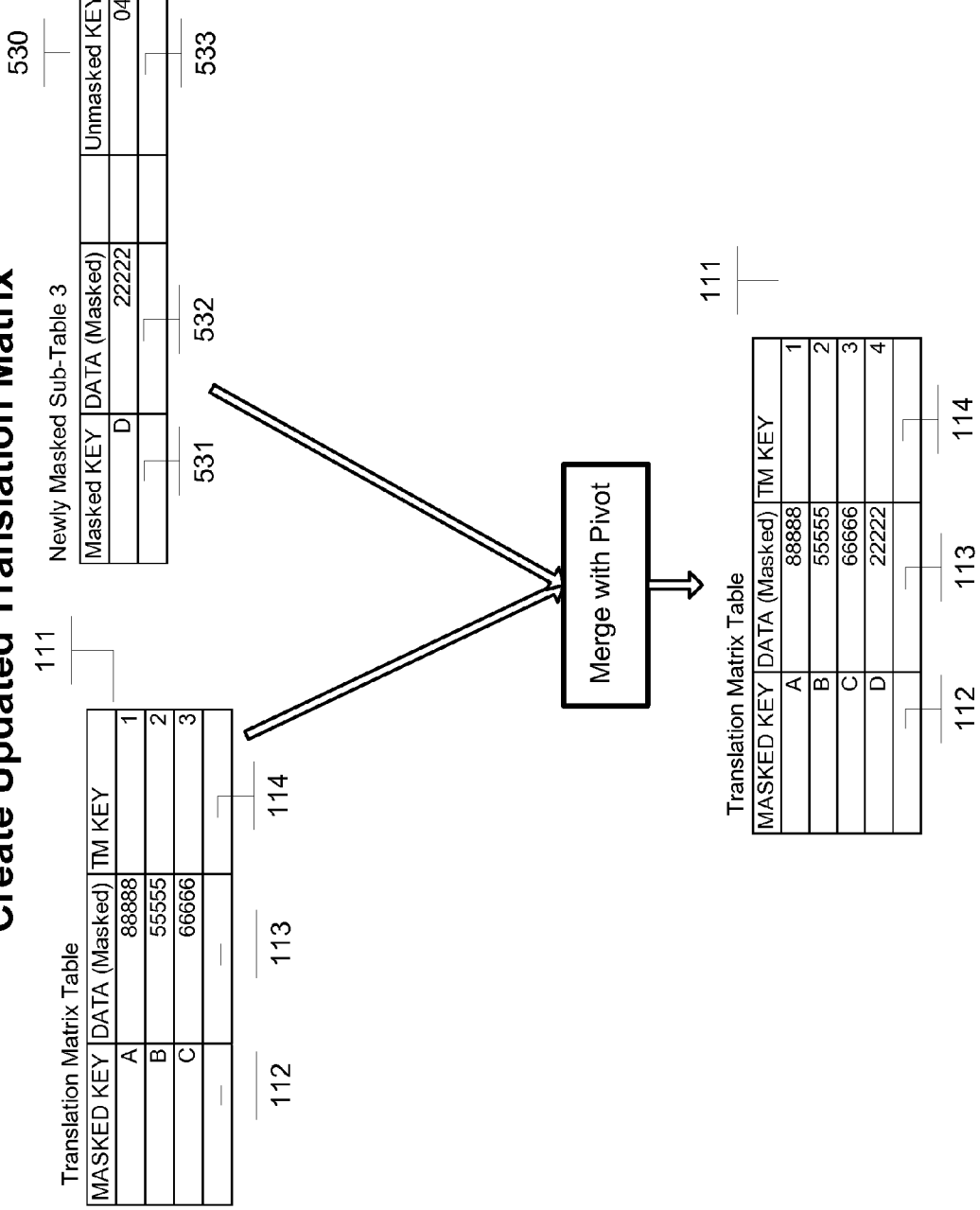

The processing involved in this step 255 may be shown in illustrative fashion in FIG. 7(a) through (c), corresponding to the processing at this step for each of Table 1 15, Table 2 25 and Table 3 35 respectively.

The processing involves copying the values in the masked key column 511, 521, 531 into corresponding records in the masked key column 112 of the translation matrix table 111, copying the values in the data (masked) column 512, 522, 532 into corresponding records in the masked data column 113 and copying the values in the unmasked key column 513, 523, 533 into corresponding records in the TM_Key column 114.

It may be seen that the processing in respect of this step for the masking of Table 1 15 is the first step in processing, so that the repository 110 is either empty, or contains an empty translation matrix table 111. As a result, the processing in this step effectively results in the creation or first update of the translation matrix table 111.

Then, the updated translation matrix table 111 and the backup copy of the primary table are moved back 260 into the repository 110. Because the pivot tables 35 are not modified, it is not strictly necessary to copy them back into the repository 110.

Finally, the repository 110 is unlocked 265, enabling another process to lock and access it to perform a data masking operation.

Figure 8A:
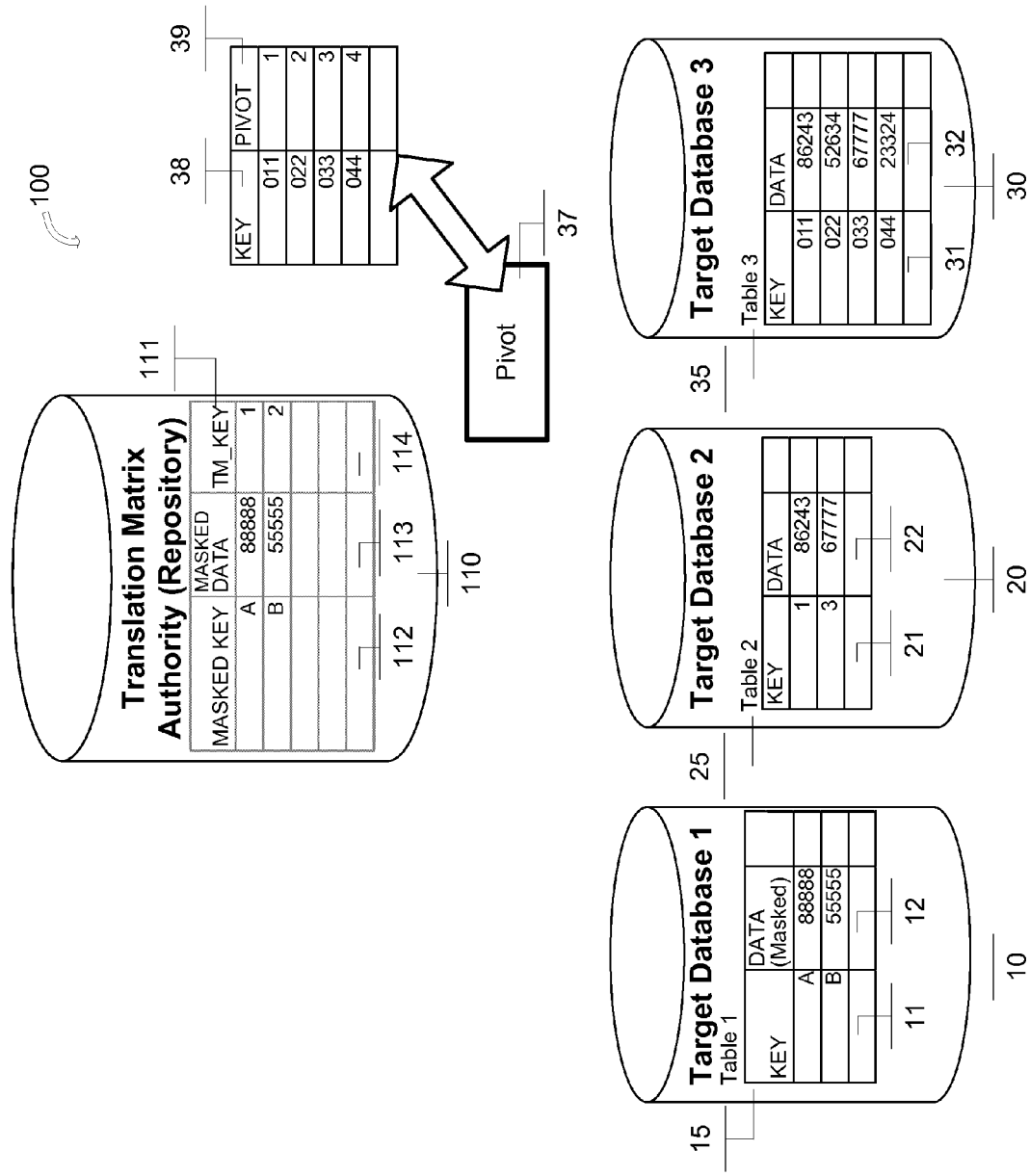
FIG. 8 are various representations of the simplified block diagram of FIG. 1, updated to show changes to the tables and the translation matrix table of FIG. 7 in accordance with completion of data masking of each of the tables in turn.
Figure 8B:
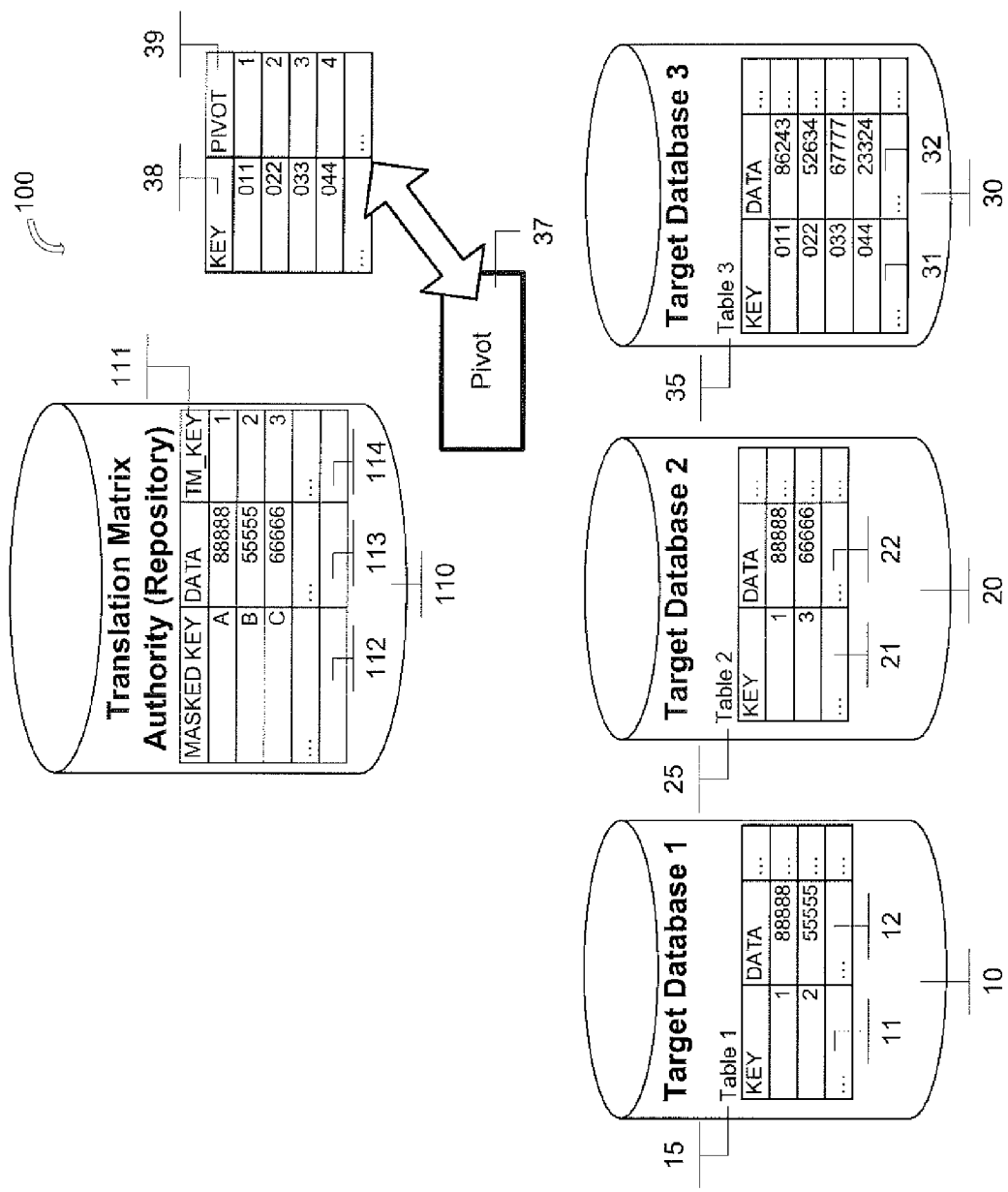
Figure 8C:
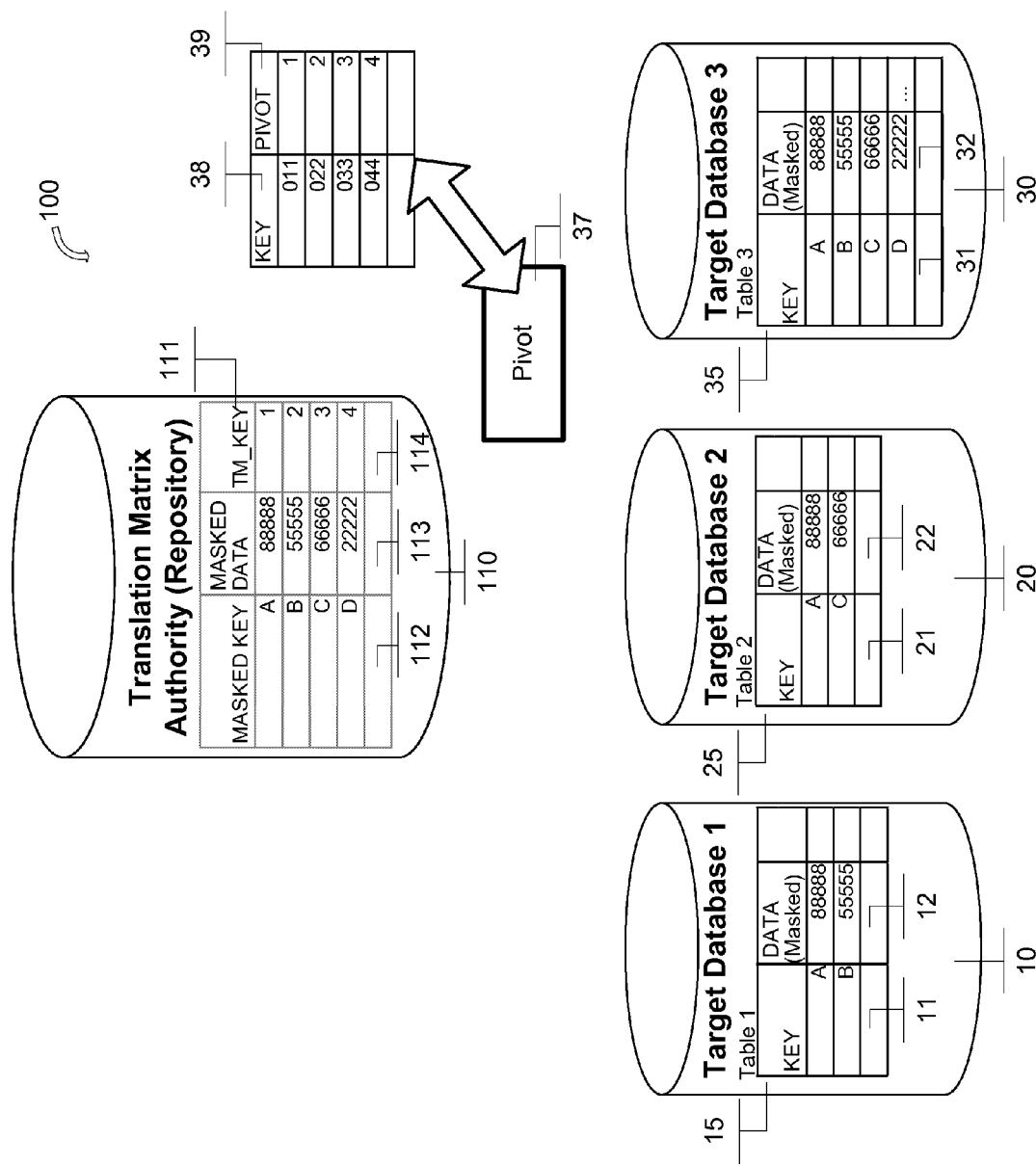

FIGS. 8(a) through (c) show the effects on the tables 10, 20, 30 and the translation matrix table 111 as a result of the data masking procedure described herein after each primary table 15, 25, 35 has in turn been processed. As can be seen, after each table 15, 25, 35 has been processed, the unmasked records in the corresponding key column 11, 21, 31 and data column 12, 22, 32 columns have been replaced by masked versions thereof and the translation matrix table 111 has been built up to store the masking data for any new records that had not been previously processed.

Those having ordinary skill in this art will appreciate that preferably, where a plurality of columns in a table are to be masked, they be masked within a single locking operation, as shown in the Figures. While it is certainly possible to perform a masking operation on a single column within a table, it will be recognized that such an activity will be inherently less efficient, having regard to the additional resource locking and copying steps that would be invoked for each column, rather than, as set out above, for each table.

Additionally, while the description of operation has been made and shown in the Figures in terms of tables, those having ordinary skill in this art will readily appreciate that the proceeding described could be viewed, at an atomic level, as operating on a record by record basis, with each table and sub-table discussed consisting of a plurality of records.

Figure 9:
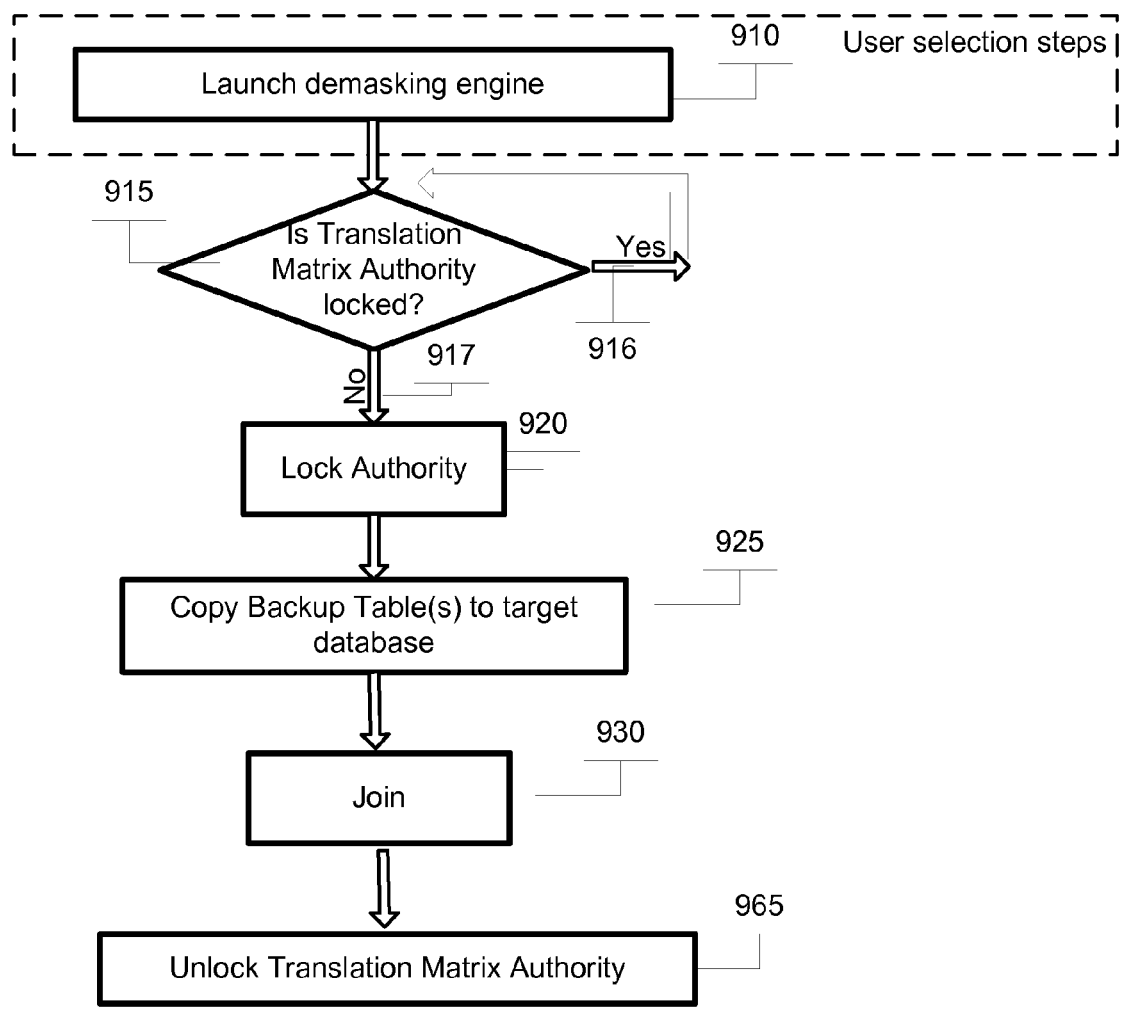
FIG. 9 is a flow chart showing processing steps that may be followed in de-masking a table that has been previously masked in accordance with the processing steps of FIG. 2.

Turning now to FIG. 9, there is shown a simplified flow chart of processing steps to accomplish data de-masking across a plurality of interrelated databases. De-masking may be desirable when updating test software, for example to debug a new feature in a software release that involves greater integration of the various databases. In such circumstances, it would be advantageous to roll back the masking performed on the test database, integrate the new portions of the database and then re-assert the masking of the entire database system as described previously.

Initially, the de-masking engine is launched 910. At step 915, an inquiry is made as to the lock status of the repository 110. If the repository 110 is locked 916, this signifies that an update of a data structure therein is in progress and processing stalls until the repository 110 is unlocked 917. Alternatively processing may be halted and an error message displayed.

At this point, the repository 110 is locked 920, so as to preclude interference by another process in the masking operation being performed by the masking engine.

Then the appropriate backup table previously stored in the repository 110 is copied back to the set of target databases 925.

After the backup table has been copied 925, the de-masking is performed 930 by joining the backup table to the masked version of the corresponding primary table by equating the key column in the masked version of the primary table to the masked key column in the backup table (in the event that the key column was identified as a column to be masked) or to the same key column in the backup table (in the event that the key column was not identified as a column to be masked).

Figure 10:
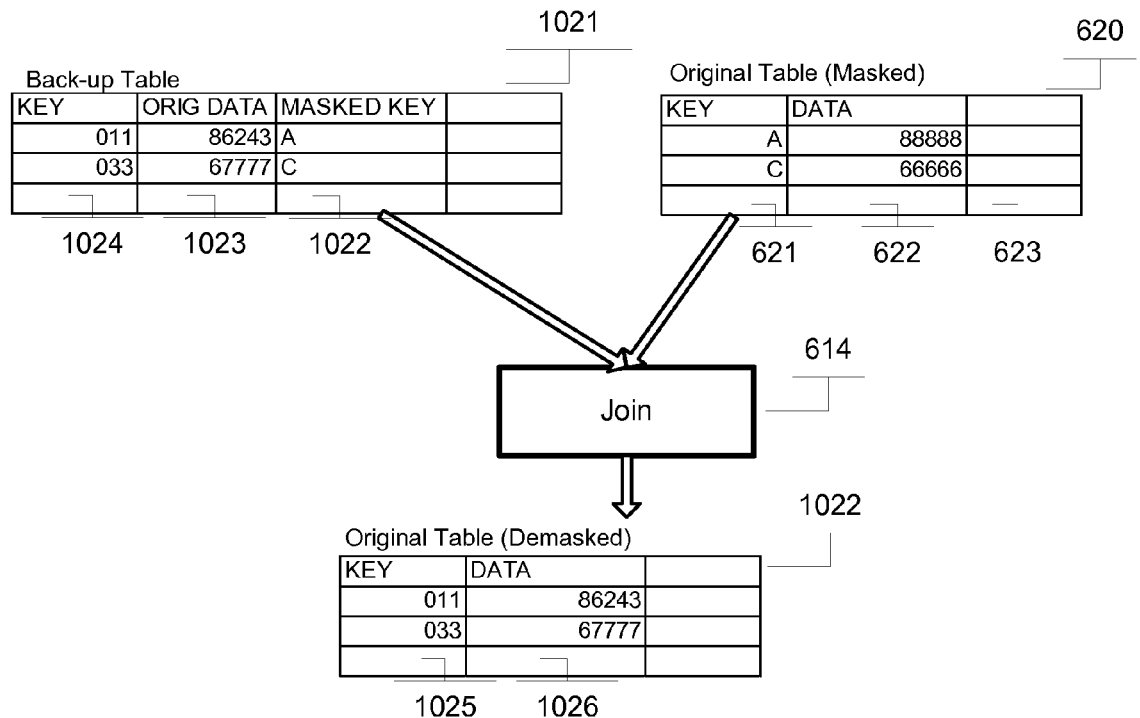
FIG. 10 is a simplified processing flow diagram showing joining of a masked table with a backup table to recover an de-masked version of an original primary table.

The processing involved in this step 930 may be shown in illustrative fashion in FIG. 10. The scenario envisaged in FIG. 10 is for de-masking Table 2 25 to create a reconstituted Table 2 1022 from backup table 1021. While pivot tables 37 were not employed in this example, those having ordinary skill in this art will appreciate that the approach may be extended to scenarios in which pivot tables 37 were employed, such as for de-masking Table 3 35. The processing involves looking up the value in the key column 621 of the original masked table 620 in the backup table 1021 to identify the appropriate row record. In the example scenarios shown in the Figures, the key column 21 was one of the columns to be masked. As such, the key column 621 contains masked data and must be compared against records in the masked key column 1022. If, however, the key column 21 was not masked, the key column 621 would not contain masked data. As such, it should also be compared against records in the key column 1024.

The value in the corresponding key column 1024 is copied into the key column 1025 for the corresponding record in the reconstituted Table 2 1022 and the value in the corresponding original data column 1023 is copied into the data column 1026 for the corresponding record in the reconstituted Table 2 1022.

Finally, the repository 710 is unlocked 965, enabling another process to lock and access it to perform a data masking operation.

The present application can be implemented in digital electronic circuitry, or in computer hardware, firmware, software, or in combination thereof. Apparatus of the application can be implemented in a computer program product tangibly embodied in a machine-readable storage device for execution by a programmable processor; and methods actions can be performed by a programmable processor executing a program of instructions to perform functions of the application by operating on input data and generating output. The application can be implemented advantageously on a programmable system including at least one input device, and at least one output device. Each computer program can be implemented in a high-level procedural or object-oriented programming language, or in assembly or machine language, if desired; and in any case, the language can be a compiled or interpreted language.

Suitable processors include, by way of example, both general and specific microprocessors. Generally, a processor will receive instructions and data from a read-only memory and/or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches and/or flip flops. Any of the foregoing can be supplemented by, or incorporated in ASICs (application-specific integrated circuits), FPGAs (field-programmable gate arrays) and/or DSPs (digital signal processors).

Examples of such types of computer are programmable processing systems which execute the methods disclosed herein, suitable for implementing or performing the apparatus or methods of the application. The system may comprise a processor, a random access memory, a hard drive controller, and/or an input/output controller, coupled by a processor bus.

It will be apparent to those having ordinary skill in this art that various modifications and variations may be made to the embodiments disclosed herein, consistent with the present application, without departing from the spirit and scope of the present application.

For example, various optimization approaches can be taken to enhance overall performance by executing steps in parallel and/or logically grouping various steps together.

While preferred embodiments are disclosed, this is not intended to be limiting. Rather, the general principles set forth herein are considered to be merely illustrative of the scope of the present application and it is to be further understood that numerous changes covering alternatives, modifications and equivalents may be made without straying from the scope of the present application, as defined by the appended claims.

Further, the foregoing description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

Moreover, all dimensions described herein are intended solely to be exemplary for purposes of illustrating certain embodiments and are not intended to limit the scope of the invention to any embodiments that may depart from such dimensions as may be specified.

Directional terms such as "upward" and "downward", "left" and "right" are used to refer to direct in the drawings to which reference is made, unless otherwise stated. Similarly, needs such as "inward" and "outward" are used to refer to directions toward and away from, respectively, the geometric centre of a device or area and designated parts thereof.

References in the singular tense include the plural and vice versa, unless otherwise noted.

Certain terms are used throughout to refer to particular components. As one skilled in the art will appreciate, manufacturers may refer to a component by different names. It is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances.

Also, the term "couple" in any form is intended to mean either an direct or indirect connection through other devices and connections.

Other embodiments consistent with the present application will become apparent from consideration of the specification and the practice of the application disclosed herein.

The purpose of the Abstract is to enable patent offices and the public generally, and especially persons having ordinary skill in the art who are not familiar with patent or legal terms or phraseology, to quickly determine from a cursory inspection, the nature of the technical disclosure of the application. The Abstract is neither intended to define the invention of this application, which is measured by the claims, nor is it intended to be limiting as to the scope of the invention in any way.

Accordingly, the specification and the embodiments disclosed therein are to be considered exemplary only, with a true scope and spirit of the invention being disclosed by the following claims.

What is claimed is:

1. A method for data masking at least one data field of at least one data record in a primary database and at least one data field of at least one data record in a secondary database that has a key field having a correspondence with a key field in the at least one data record in the primary database, using a table of translation matrix records comprising an unmasked key field and at least one masked data field corresponding to the at least one data field of the at least one data record, the method comprising the actions of:

with respect of the primary database:

comparing the key field of the at least one data record in the corresponding database against the unmasked key field of each of the translation matrix records;

populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record;

populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record;

masking the at least one data field of the second sub-table record;

adding the first sub-table record or the masked second sub-table record as a masked record in a masked copy of the corresponding database; and if the masked second sub-table record was created, populating a translation matrix record corresponding thereto using the key field and the at least one data field for the unmasked key field and the at least one masked data field;

repeating the actions performed with respect of the primary database with respect to the secondary database and further comprising:

if the key field in the at least one data record in the primary database and the key field in the at least one data record in the secondary database are different, setting out the correspondence therebetween in a pivot table including both of the key fields; and comparing the key field of the at least one data record in the secondary database against the unmasked key field of each of the translation matrix records further comprises looking up the at least one key field of the at least one data record in the secondary database in the corresponding key field of the pivot table and comparing the other key field thereof against the unmasked key field of each of the translation matrix records;

whereby at least one data field of the at least one data record of the primary database and the at least one data field of the at least one data record of the secondary database are masked in a consistent manner.

2. The method according to claim 1, wherein a value of the key field in the at least one data record in the primary database and of the key field in the at least one data record in the second database are the same.

3. The method according to claim 1, wherein the at least one data field to be masked includes the key field.

4. The method according to claim 1, wherein the masked copies of the primary and secondary databases behave the same as the primary and secondary databases respectively.

5. The method according to claim 4, wherein the masked copies of the primary and secondary databases maintain the relational integrity of the primary and secondary databases.

6. The method according to claim 1, wherein masking the at least one data field of the second sub-table record further comprises performing at least one data transformation on the at least one data field of the second sub-table entry.

7. The method according to claim 6, wherein the data transformation is pre-selected before commencing the actions with respect of the primary or secondary databases.

8. The method according to claim 1, further comprising:
before performing the actions with respect to one of the primary or secondary databases:
ensuring that the table of translation matrix records is not being accessed; and
reserving exclusive access to the table of translation matrix records until released;
after performing the actions with respect to the one of the primary or secondary databases, releasing exclusive access to the table of translation matrix records.

9. The method according to claim 8, comprising:
after reserving exclusive access to the table of translation matrix records until released, copying the table of translation matrix records from a secure repository; and
before releasing exclusive access to the table of translation matrix records, replacing the table of translation matrix records into the secure repository.

10. The method according to claim 9, further comprising removing and replacing a pivot table comprising the two key fields and establishing a one to one correspondence therebetween.

11. The method according to claim 9, wherein replacing the table of translation matrix records into the secure repository further comprises replacing a backup record comprising the key field and the at least one data field of the at least one data record to be masked into the secure repository.

12. The method according to claim 11, comprising adding a masked key field to the backup record containing the masked value of the key field of the at least one data record.

13. A method for de-masking the at least one data record in at least one of the primary database and the secondary database that has been masked according to the method of claim 12, comprising:
reserving exclusive access to the table of translation matrix records until released;
removing at least one of the backup record stored in the repository from the secure repository;
reviewing the table of translation matrix records to determine if the key field of the at least one data record has been masked;
if the key field of the at least one data record has been masked:
comparing the key field of the at least one data record against the masked key field of each of the backup records; and
populating a de-masked data record comprising the key field optionally corresponding to the at least one data field of the at least one data record, using the masked key field and optionally the at least one data field of the backup record;
if the key field of the at least one data record has not been masked:
comparing the key field of the at least one data record against the key field of each of the backup records; and
populating a de-masked data record comprising the key field and at least one de-masked data field corresponding to the at least one data field of the at least one data record, using the key field and the at least one data field of the backup record; and
releasing exclusive access to the table of translation matrix records.

14. The method according to claim 1, wherein the at least one data field is a confidential data field.

15. The method of claim 1 comprising repeating the actions with respect to the primary database for all records in each table of the primary database, and repeating the actions with respect of the secondary database for all records in each table of the secondary database until the masked copy of the corresponding databases comprises masked copies of all records in all tables of the primary and secondary databases.

16. A system for data masking at least one data field of at least one data record in a primary database and at least one data field of at least one data record in a secondary database that has a key field having a correspondence with a key field in the at least one data record in the primary database, the system comprising:
   a memory for storing data records, including a table of translation matrix records comprising an unmasked key field and at least one masked data field corresponding to the at least one data field of the at least one data record;
   a processor coupled to the memory for:
      in respect of the primary database, executing instructions for:
         comparing the key field of the at least one data record in the corresponding database against the unmasked key field of each of the translation matrix records;
         populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record;
         populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record;
         masking the at least one data field of the second sub-table record;
         adding the first sub-table record or the masked second sub-table record as a masked record in a masked copy of the corresponding database;
         if the masked second sub-table record was created, populating a translation matrix record corresponding thereto using the key field and the at least one data field for the unmasked key field and the at least one masked data field; and
      repeating the instructions in respect of the primary database with respect to the secondary database and further comprising:
         if the key field in the at least one data record in the primary database and the key field in the at least one data record in the secondary database are different, setting out the correspondence therebetween in a pivot table including both of the key fields; and
         comparing the key field of the at least one data record in the secondary database against the unmasked key field of each of the translation matrix records further comprises looking up the at least one key field of the at least one data record in the secondary database in the corresponding key field of the pivot table and comparing the other key field thereof against the unmasked key field of each of the translation matrix records;
      whereby at least one data field of the at least one data record of the primary database and the at least one data field of the at least one data record of the secondary database are masked in a consistent manner.

17. A processor in a system for data masking at least one data field of at least one data record in a primary database and at least one data field of at least one data record in a secondary database that has a key field having a correspondence with a key field in the at least one data record in the primary database, the processor being operatively coupled to a memory for storing data records including a table of translation matrix records comprising an unmasked key field and at least one masked data field corresponding to at least one data field of the at least one data record for:
   in respect of the primary database, executing instructions for:
      comparing the key field of the at least one data record in the corresponding database against the unmasked key field of each of the translation matrix records;
      populating a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record;
      populating a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record;
      masking the at least one data field of the second sub-table record;
      adding the first sub-table record or the masked second sub-table record as a masked record in a masked copy of the corresponding database;
      if the masked second sub-table record was created, populating a translation matrix record corresponding thereto using the key field and the at least one data field for the unmasked key field and the at least one masked data field; and
   repeating the instructions in respect of the primary database with respect to the secondary database and further comprising:
      if the key field in the at least one data record in the primary database and the key field in the at least one data record in the secondary database are different, setting out the correspondence therebetween in a pivot table including both of the key fields; and
      comparing the key field of the at least one data record in the secondary database against the unmasked key field of each of the translation matrix records further comprises looking up the at least one key field of the at least one data record in the secondary database in the corresponding key field of the pivot table and comparing the other key field thereof against the unmasked key field of each of the translation matrix records;
   whereby at least one data field of the at least one data record of the primary database and the at least one data field of the at least one data record of the secondary database are masked in a consistent manner.

18. A computer-readable medium coupled to a processor, in a system for data masking at least one data field of at least one data record in a primary database and at least one data field of at least one data record in a secondary database that has a key field having a correspondence with a key field in the at least one data record in the primary database, the medium for storing data records including a table of translation matrix records comprising an unmasked key field and at least one masked data field corresponding to at least one data field of the at least one data record, and having stored thereon, computer-readable and computer-executable instructions which, when executed by the processor, cause the processor to:

in respect of the primary database:
compare the key field of the at least one data record in the corresponding database against the unmasked key field of each of the translation matrix records;
populate a first sub-table record, if the unmasked key field of a translation matrix record matches the key field of the at least one data record, the first sub-table record comprising an unmasked key field and at least one masked data field corresponding to the at least one data field of the at least one data record, using the unmasked key field and the at least one masked data field of the matching translation matrix record;
populate a second sub-table record, if no unmasked key field of any translation matrix record matches the key field of the at least one data record, the second sub-table record comprising a key field and at least one data field corresponding to the at least one data field of the at least one data record, using the corresponding key field and the at least one data field of the at least one data record;
mask the at least one data field of the second sub-table record;
add the first sub-table record or the masked second sub-table record as a masked record in a masked copy of the corresponding database;
if the masked second sub-table record was created, populate a translation matrix record corresponding thereto using the key field and the at least one data field for the unmasked key field and the at least one masked data field; and repeat the instructions in respect of the primary database with respect to the secondary database and further comprising:
if the key field in the at least one data record in the primary database and the key field in the at least one data record in the secondary database are different, setting out the correspondence therebetween in a pivot table including both of the key fields; and
comparing the key field of the at least one data record in the secondary database against the unmasked key field of each of the translation matrix records further comprises looking up the at least one key field of the at least one data record in the secondary database in the corresponding key field of the pivot table and comparing the other key field thereof against the unmasked key field of each of the translation matrix records;

whereby at least one data field of the at least one data record of the primary database and the at least one data field of the at least one data record of the secondary database are masked in a consistent manner.

* * * * *